United States Patent [19]

Fauske et al.

[11] Patent Number: 5,015,437
[45] Date of Patent: May 14, 1991

[54] GRAPHITE CORE BLOCKS FOR HIGH TEMPERATURE GAS-COOLED REACTOR

[75] Inventors: Hans K. Fauske, Hinsdale, Ill.; George H. Clare, Aiken, S.C.

[73] Assignee: Westinghouse Electric Corp., Pittsburgh, Pa.

[21] Appl. No.: 437,947

[22] Filed: Nov. 17, 1989

[51] Int. Cl.⁵ .................................................. G21C 3/56
[52] U.S. Cl. ..................... 376/385; 376/395; 376/427; 376/458
[58] Field of Search ............... 376/427, 385, 395, 458

[56] References Cited

U.S. PATENT DOCUMENTS

| | | | |
|---|---|---|---|
| 2,790,760 | 4/1957 | Powell | 204/193 |
| 3,873,420 | 3/1975 | Statham | 176/77 |
| 3,888,735 | 6/1975 | Cunningham et al. | 176/84 |
| 3,926,720 | 12/1975 | Hosegood | 176/18 |
| 3,988,397 | 10/1976 | Hackstein et al. | 264/0.5 |
| 4,022,865 | 5/1977 | Hackstein et al. | 423/4 |
| 4,704,248 | 11/1987 | Lee et al. | 376/247 |

*Primary Examiner*—Brooks H. Hunt
*Assistant Examiner*—N. Bhat
*Attorney, Agent, or Firm*—M. G. Panian

[57] ABSTRACT

A reactor core for a gas-cooled reactor, which core is composed of a plurality of prismatic bodies (2) of graphite containing nuclear fuel and having a top wall, a bottom wall and a plurality of vertically extending side walls, each graphite body (2) being provided with a plurality of first coolant flow channels (4) extending vertically between the top wall and the bottom wall, and with a plurality of second coolant flow channels (6) extending transversely to the first channels (4) and each interconnecting a plurality of the first channels (4).

8 Claims, 1 Drawing Sheet

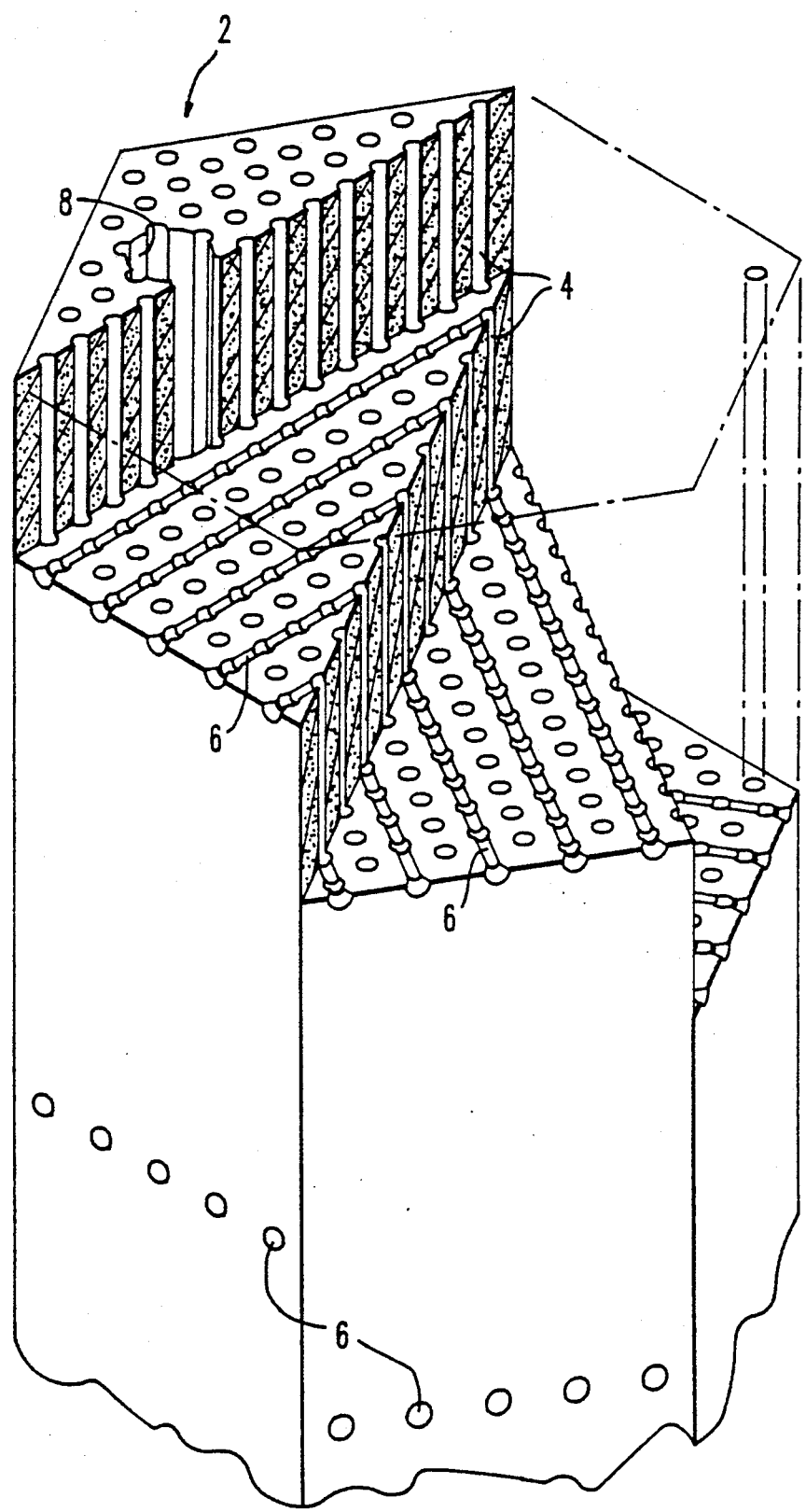

GRAPHITE CORE BLOCKS FOR HIGH TEMPERATURE GAS-COOLED REACTOR

BACKGROUND OF THE INVENTION

The present invention relates to high temperature gas-cooled reactors having a core composed of graphite blocks containing nuclear fuel. Such a core serves to moderate neutrons in the chain reaction, to conduct heat from the fuel to a coolant, and to direct coolant from an inlet to an outlet of the reactor core.

A core of this type can be built up from a plurality of individual graphite blocks provided with coolant flow channels. The core dimensions of interest for commercial applications are relatively large, on the order of 3.3 meters in diameter to 3.3 to 6.6 meters in height. To construct such a core, a large number of graphite blocks, each of which is small enough to facilitate the removal and replacement of individual blocks, are assembled together. Typically, several blocks are stacked on top of one another and a plurality of such stacks are disposed adjacent one another to form the core. The blocks are provided with vertical flow passages which are placed in alignment to form continuous coolant flow channels which extend from the bottom to the top of the core.

Graphite is a relatively good thermal conductor and has a high melting point, of the order of 3500° C. When coupled with a high melting point fuel, which may be in the form of pellets embedded in the graphite, such a reactor appears to be relatively immune to accidents which could melt the core.

However, the ability of the core to resist melting depends on the maintenance of a significant flow of coolant, typically helium, through the core during power operations.

While the provision of a substantial number of vertical coolant channels offers a reasonably reliable cooling action, a blockage occurring in any one vertical channel can lead to local heating and blockage of a sufficient number of channels could initiate core melting. Such a blockage could be produced, for example, by foreign material accidentally dropped into the core and/or accumulating below the core, the breaking off of parts within the core enclosure, the breaking off of a piece from a graphite block, misalignment of graphite blocks, or the accumulation, within a channel, of debris or impurities suspended in the coolant fluid.

If blockage should occur in a channel, localized heating can occur not only at the blockage, but in the core region adjacent the channel and upstream and downstream of the blockage.

SUMMARY OF THE INVENTION

It is a primary object of the present invention to reduce the danger of core overheating due to a localized blockage in a flow channel.

A more specific object of the invention is to provide alternate flow paths for coolant in the event of the occurrence of such a blockage.

The above and other objects are achieved, in accordance with the present invention, in a reactor core for a gas-cooled reactor, which core is composed of a plurality of prismatic bodies of graphite, each body containing nuclear fuel and having a top wall, a bottom wall and a plurality of vertically extending side walls, and each body being provided with a plurality of first coolant flow channels extending vertically between the top wall and the bottom wall, by further providing each body with a plurality of second coolant flow channels extending transversely to the first channels and each interconnecting a plurality of the first channels.

BRIEF DESCRIPTION OF THE DRAWING

The Figure is a perspective, broken-away view of a graphite core block provided with coolant flow channels according to the present invention.

DESCRIPTION OF THE PREFERRED EMBODIMENTS

The Figure illustrates a graphite core block 2 which may be assembled with a plurality of identical graphite core blocks, in the manner described above, to form a reactor core. In such a core, horizontally adjacent blocks will normally be separated by a small gap.

Block 2 is shown broken away in several layers to illustrate the various flow channels therein.

In accordance with the prior art, block 2 is provided with a plurality of vertical channels 4 extending throughout the height of block 2. Each channel 4 can be spaced inwardly from the edges of its associated blocks or can be formed of mating half cylinder recesses at the edges of horizontally adjacent blocks. The various core blocks are stacked atop one another so that continuous vertical channels 4 are formed to communicate with the region above and below the core.

Under normal conditions, the flow of coolant, typically helium, vertically through channels 4 will provide adequate cooling of the core. However, if a blockage should develop in a channel 4, the flow of coolant through that channel will be prevented and substantial local heating can occur in the region where coolant flow no longer occurs.

According to the invention, the effect of such a blockage is alleviated by the provision of a plurality of transverse channels 6 each interconnecting a row of vertical channels 4.

Channels 6 extend entirely across the width of block 2 so that each channel 6 communicates with regions adjacent at opposite lateral sides of block 2 and with corresponding transverse channels in adjacent blocks.

According to a further feature of the invention, each end of each channel 6 is flared, as shown in the Figure, to assure communication with corresponding channels in adjacent blocks in the event of slight misalignments between blocks.

Channels 6 may be horizontal or may be inclined to the horizontal. The inclination can vary over a substantial range. If channels 6 are inclined to the horizontal, it is preferred that the inclination be small enough to assure that each channel 6 will extend between vertical sides of block 2. However, a horizontal orientation is preferred because this will simplify the task of aligning the channels in one block with those in each adjacent block.

Preferably, as illustrated, transverse channels 6 are arranged in a plurality of layers, with the channels of each layer interconnecting alternate rows of vertical channels 4 and extending between two opposite faces of block 2. Each row of channels 6 extends in a direction which is transverse to the direction of the vertically adjacent layers of channels.

The diameters which the channels should have to provide sufficient coolant flow can be determined according to established principles in the art. For a typical core having dimensions in the range indicated earlier herein, the vertical coolant flow channels 4, and the nonvertical channels 6 in each layer of such channels may have a center-to-center spacing of the order of 10 cm.

In the illustrated embodiment, the channels 6 in each layer interconnect every other row of vertical channels 4 and the channels 6 in each layer are arranged so that each vertical channel 4 communicates with spaced layers of the nonvertical channels 6. The nonvertical channels 6 extending between two vertical sides of block 2 may be offset, from one layer of channels 6 to the next, by the spacing, perpendicular to those channels, between adjacent rows of vertical channels 4, to assure that all vertical channels 4 communicate with at least some vertically spaced nonvertical channels 6.

According to one alternative embodiment of the invention, each layer of channels 6 can include a sufficient number of channels to interconnect all rows of vertical channels 4, rather than every other row as shown in the Figure. In addition, each layer of channels 6 can be oriented to extend between two side walls of block 2 other than diametrically opposed side walls. Thus, some or all of channels 6 can extend between two side walls which are separated by a single intervening side wall or can extend between two adjacent side walls. According to a further alternative, the arrangement of channels 6 illustrated in the Figure can be supplemented by auxiliary channels interconnecting any vertical channels 4 which are not interconnected by the arrangement shown.

Further, if desired, two or more groups of intersecting channels 6 can be disposed in a single plane, or layer.

In addition, when a core is built up from a plurality of small blocks 2, some of the channels 6 can be formed by molding semicircular recesses in the upper and lower walls of each block such that the recesses formed in vertically adjacent blocks of the core are located in registry to form channels 6 of circular cross section.

The Figure further shows one large diameter vertical passage 8 which may be provided to receive a control rod or instrumentation, as is conventional in the art.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. In a reactor core for a gas-cooled reactor, which core is composed of a plurality of prismatic bodies of graphite, each body containing nuclear fuel and having a top wall, a bottom wall and a plurality of vertically extending side walls, and each graphite body being provided with a plurality of first coolant flow channels extending vertically between the top wall and the bottom wall, the improvement wherein each said body is further provided with a plurality of second coolant flow channels extending transversely to said first channels and each interconnecting a plurality of said first channels to provide alternate flow paths for the coolant.

2. A core as defined in claim wherein each of said second channels extends between two of said side walls.

3. A core as defined in claim 2 wherein the two side walls between which each said second channel extends are separated by at least one intervening side wall.

4. A core as defined in claim 2 wherein said second channels are divided into a plurality of groups and said groups are spaced apart in the vertical direction of said body.

5. A core as defined in claim 4 wherein said second channels of each said group extend parallel to one another.

6. A core as defined in claim 5 wherein said second channels of each said group extend in a direction which forms an angle, about a vertical axis, with the direction in which said second channels of each adjacent group extend.

7. A core as defined in claim 6 wherein said first channels are arranged in a pattern forming a plurality of rows extending in the direction in which said second channels of each said group extend and said second channels of each said group interconnect alternate rows of said first channels.

8. A core as defined in claim 7 wherein said second channels of each said group extend between two of said side walls which are separated by at least one intervening side wall.

* * * * *